US009167575B2

(12) United States Patent
Park

(10) Patent No.: US 9,167,575 B2
(45) Date of Patent: Oct. 20, 2015

(54) CONTROL INFORMATION TRANSMISSION AND UPLINK CONTROL CHANNEL RESOURCE MAPPING

(71) Applicant: KT CORPORATION, Gyeonggi-do (KR)

(72) Inventor: Kyu Jin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 103 days.

(21) Appl. No.: 13/946,141

(22) Filed: Jul. 19, 2013

(65) Prior Publication Data

US 2014/0036803 A1 Feb. 6, 2014

(30) Foreign Application Priority Data

Aug. 6, 2012 (KR) .................... 10-2012-0085937
Aug. 24, 2012 (KR) .................... 10-2012-0093098
Nov. 22, 2012 (KR) .................... 10-2012-0132928
Dec. 14, 2012 (KR) .................... 10-2012-0146706

(51) Int. Cl.
*H04L 12/28* (2006.01)
*H04W 72/04* (2009.01)
*H04L 5/00* (2006.01)

(52) U.S. Cl.
CPC ........... *H04W 72/042* (2013.01); *H04L 5/0055* (2013.01); *H04L 5/0094* (2013.01); *H04L 5/001* (2013.01); *H04L 5/0035* (2013.01); *H04L 5/0064* (2013.01); *H04W 72/0446* (2013.01)

(58) Field of Classification Search
USPC .................................................. 370/310–350
See application file for complete search history.

(56) References Cited

U.S. PATENT DOCUMENTS

| | | | |
|---|---|---|---|
| 2012/0320846 A1* | 12/2012 | Papasakellariou et al. ... | 370/329 |
| 2013/0114530 A1* | 5/2013 | Chen et al. ................... | 370/329 |
| 2013/0194931 A1* | 8/2013 | Lee et al. ..................... | 370/241 |
| 2013/0215842 A1 | 8/2013 | Han et al. | |
| 2013/0229997 A1* | 9/2013 | Lunttila et al. ............... | 370/329 |
| 2013/0230017 A1* | 9/2013 | Papasakellariou et al. ... | 370/330 |
| 2013/0242890 A1* | 9/2013 | He et al. ....................... | 370/329 |
| 2014/0003375 A1 | 1/2014 | Nam et al. | |
| 2014/0036810 A1* | 2/2014 | Harrison et al. ............. | 370/329 |
| 2014/0078980 A1* | 3/2014 | Frenne et al. ................ | 370/329 |

OTHER PUBLICATIONS

Frenna, U.S. Appl. No. 61/679,140.*
Harrison, U.S. Appl. No. 61/679,037.*

(Continued)

*Primary Examiner* — Kwang B Yao
*Assistant Examiner* — Juvena Loo
(74) *Attorney, Agent, or Firm* — IP Legal Services, LLC

(57) ABSTRACT

The disclosure is related to transmitting downlink control information through a downlink control channel adopted in a data region, and transmitting uplink control information for user equipment receiving the downlink control information. Furthermore, the disclosure is related to performing a physical uplink control channel (PUCCH) resource mapping for uplink HARQ-ACK/NACK feedback of user equipment. Herein, the uplink HARQ-ACK/NACK feedback may be performed by the user equipment in response to a downlink data channel assigned according to downlink scheduling information transmitted through the adopted downlink control channel.

12 Claims, 8 Drawing Sheets

(56) References Cited

OTHER PUBLICATIONS

Mediatek Inc., "Necessity of Multiplexing of Localized and Distributed ePDCCH Parts in the Same PRBs", R1-122168, 3GPP TSG RAN WG1 Meeting #69, Prague, Czech Republic, May 21-25, 2012, pp. 1-3.

Panasonic, "Definitions of eREG and eCCE", R1-122201, 3GPP TSG RAN WG1 Meeting #69, Prague, Czech Republic, May 21-25, 2012, pp. 1-4.

Samsung, "HARQ-ACK PUCCH Resources in Response to ePDCCH Detections", R1-122259, 3GPP TSG RAN WG1 Meeting #69, Prague, Czech Republic, May 21-25, 2012, pp. 1-2.

LG Electronics, "On ePDCCH Search Space Design Supporting Localized and Distributed Transmission", R1-122309, 3GPP TSG RAN WG1 Meeting #69, Prague, Czech Republic, May 21-25, 2012, pp. 1-11.

Mediatek Inc., "Physical Structure of ePDCCH and Its Mulitplexing with PDSCH", R1-120629, 3GPP TSG RAN WG1 #68, Dresden, Germany, Feb. 6-10, 2012, pp. 1-3.

Korean Intellectual Property Office, International Search Report for International Application No. PCT/KR2013/005959, Oct. 22, 2013.

Korean Intellectual Property Office, Written Opinion of the International Searching Authority for International Application No. PCT/KR2013/005959, Oct. 22, 2013.

Samsung, "Multiplexing Distributed and Localized ePDCCHs", R1-122256, 3GPP TSG RAN WG1 #69, Prague, Czech Republic, May 21-25, 2012, pp. 1-5.

LG Electronics, "Discussion on PUCCH Resource for ePDCCH", R1-122314, 3GPP TSG RAN WG1 Meeting #69, Prague, Czech Republic, May 21-25, 2012, pp. 1-2.

Pantech, "PUCCH resource allocation in response to E-PDCCH", R1-121367, 3GPP TSG RAN WG1 #68bis, Jeju, Korea, Mar. 26-30, 2012, pp. 1-2.

Nokia Siemens Networks et al., "Harq-ACK resource allocation for data scheduled via ePDCCH", R1-122428, 3GPP TSG RAN WG1 Meeting #69, Prague, Czech Republic, May 21-25, 2012, pp. 1-2.

Korean Intellectual Property Office, International Search Report for International Application No. PCT/KR2013/006757, Nov. 12, 2013.

Korean Intellectual Property Office, Written Opinion of the International Searching Authority for International Application No. PCT/KR2013/006757, Nov. 12, 2013

Pantech, "PUCCH resource allocation in response to E-PDCCH", R1-122456, 3GPP TSG RAN WG1 #69, Prague, Czech Republic, May 21-25, 2012, pp. 1-3.

Asustek, "PUCCH Resource Allocation Corresponding to ePDCCH", R1-122614, 3GPP TSG RAN WG1 #69, Prague, Czech Republic, May 21-25, 2012, pp. 1-2.

\* cited by examiner

CONTROL INFORMATION TRANSMISSION AND UPLINK CONTROL CHANNEL RESOURCE MAPPING

CROSS REFERENCE TO PRIOR APPLICATIONS

The present application claims priority under 35 U.S.C. §119 to Korean Patent Application No. 10-2012-0085937 (filed on Aug. 6, 2012), Korean Patent Application No. 10-2012-0093098 (filed on Aug. 24, 2012), Korean Patent Application No. 10-2012-0132928 (filed on Nov. 22, 2012), and Korean Patent Application No. 10-2012-0146706 (filed on Dec. 14, 2012), which are hereby incorporated by reference in their entirety.

BACKGROUND

The present disclosure relates to transmitting control information in a transmission/reception point and to mapping an uplink control channel resources in user equipment. Particularly, the present disclosure relates to a method and an apparatus for transmitting downlink control information through a downlink control channel newly adopted (or defined) in a data region, and transmitting uplink control information for user equipment receiving the downlink control information. Furthermore, the present disclosure relates to a method and an apparatus for performing a physical uplink control channel (PUCCH) resource mapping for uplink HARQ-ACK/NACK feedback of user equipment. Herein, the uplink HARQ-ACK/NACK feedback may be performed by the user equipment in response to a downlink data channel assigned according to downlink scheduling information transmitted through such new downlink control channel.

A wireless communication system has been designed to transmit a mass amount of data to many subscribers. However, it is difficult to increase the capacity of the wireless communication system due to limited resources of a control region. In order to overcome such limitation, use of a downlink control channel located in a data region in order to transmit downlink control information might be required.

Meanwhile, a downlink control channel is newly defined in the data region in order to improve performance and capacity of a downlink control channel in the wireless communication system. User equipment may receive downlink scheduling information through such a new downlink control channel. Accordingly, there might be a need to define a PUCCH resource mapping method such that the user equipment can perform a feedback transmission of uplink HARQ-ACK/NACK.

SUMMARY

In the above-described background, an object of the present specification is to provide a method and a transmission/reception point for transmitting control information in a wireless communication system, and a method and user equipment for uplink control channel resource mapping in a wireless communication system.

In accordance with at least one embodiment, a method may be provided for transmitting control information for a specific user equipment through a data region of physical resource-block (PRB) pairs in a subframe, in a transmission/reception point. The method may include assigning at least one enhanced physical downlink control channel (EPDCCH) set, wherein each EPDCCH set includes an X number of PRB pairs in the subframe, and the X is a natural number which is greater than or equal to "1" and is less than or equal to the number of resource blocks (RBs) per downlink bandwidth; and transmitting the control information to the specific user equipment through at least one of at least two enhanced control channel elements (ECCEs) indexed separately per EPDCCH set.

In accordance with another embodiment, a method may be provided for mapping an uplink control channel resource in user equipment. The method may include receiving control information including downlink scheduling information through at least one of at least two enhanced control channel elements (ECCEs) from a transmission/reception point, wherein the at least two ECCEs are indexed per each of at least one enhanced physical downlink control channel (EPDCCH) set, the each EPDCCH set includes an X number of physical resource-block (PRB) pairs of a subframe, and the X is a natural number which is greater than or equal to "1" and is less than or equal to the number of resource blocks (RBs) per downlink bandwidth; and performing a PUCCH resource mapping for ACK/NACK associated with a PDSCH assigned according to the downlink scheduling information, using a lowest index as one resource determination component, wherein the lowest index is at least one of a lowest index of the at least one ECCE used for reception of the control information, and a lowest index of PRB pairs used for reception the control information among the X number of the PRB pairs of the EPDCCH set.

In accordance with still another embodiment, a transmission/reception point may be provided for transmitting control information for a specific user equipment through a data region of physical resource-block (PRB) pairs in a subframe. The transmission/reception point may include a control unit configured to assign at least one enhanced physical downlink control channel (EPDCCH) set, wherein each EPDCCH set includes an X number of PRB pairs in the subframe, and the X is a natural number which is greater than or equal to "1" and is less than or equal to the number of resource blocks (RBs) per downlink bandwidth; and a transmitting unit configured to transmit the control information to the specific user equipment through at least one of at least two enhanced control channel elements (ECCEs) indexed per EPDCCH set.

In accordance with still another embodiment, user equipment may be provided. The user equipment may include a receiving unit configured to receive control information including downlink scheduling information through at least one of at least two enhanced control channel elements (ECCEs) from a transmission/reception point, wherein the at least two ECCEs are indexed per each of at least one enhanced physical downlink control channel (EPDCCH) set, the each EPDCCH set includes an X number of physical resource-block (PRB) pairs of a subframe, and the X is a natural number which is greater than or equal to "1" and is less than or equal to the number of resource blocks (RBs) per downlink bandwidth; and a control unit configured to perform a PUCCH resource mapping for ACK/NACK associated with a PDSCH assigned according to the downlink scheduling information, using a lowest index as one resource determination component, wherein the lowest index is at least one of (i) a lowest index of at least one ECCE used for reception of the control information and (ii) a product of a lowest PRB pair index and the number of ECCEs per PRB pair; and the lowest PRB pair index is a lowest index of PRB pairs used for reception of the control information among the X number of the PRB pairs constituting the EPDCCH set.

A method and a transmission/reception point for transmitting control information, and a method and user equipment for uplink control channel resource mapping in a wireless communication system according to the present embodiment may have effects of transmitting downlink control information through a downlink control channel, and of transmitting uplink control information for user equipment receiving the downlink control information.

DETAILED DESCRIPTION OF EMBODIMENTS

Figure 1:
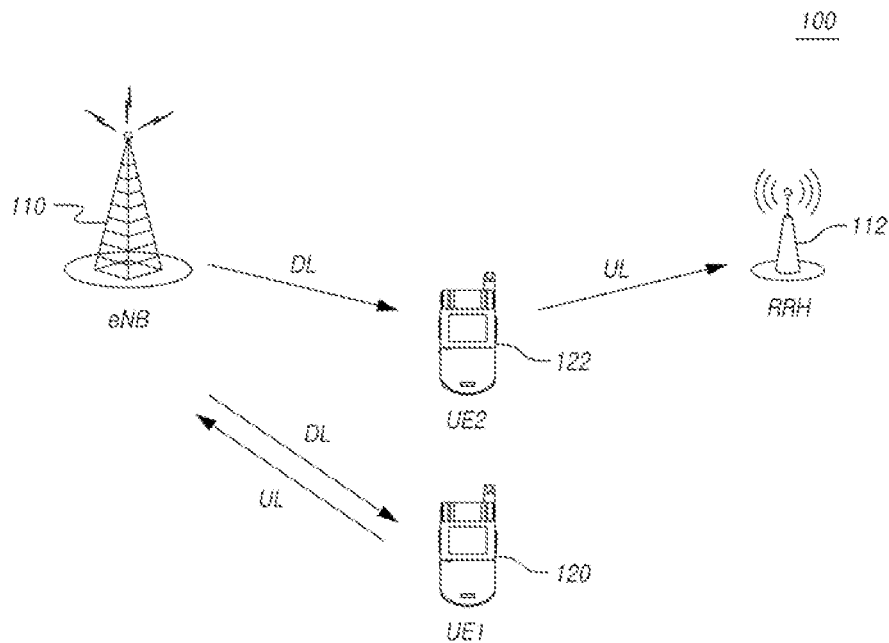
FIG. 1 is an exemplary diagram illustrating a wireless communication system to which at least one embodiment may be applied.

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be constituted based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point.

FIG. 1 is an exemplary diagram illustrating a wireless communication system to which at least one embodiment may be applied.

Referring to FIG. 1, wireless communication system 100 may be one of a coordinated multi-point transmission/reception (CoMP) system, a coordinated multi-antenna transmission system, and a coordinated multi-cell communication system. Herein, the CoMP system may transmit signals through cooperation between a plurality of transmission/reception points. Wireless communication system 100 such as a CoMP system may include a plurality of transmission/reception points 110 and 112, and at least one user equipment (UE) 120 and 122.

The transmission/reception points may be, as shown in the figure, one of eNB 110 and RRH 112. Herein, eNB 110 may be a base station or a macrocell (or macronode). RRH 112 may be at least one picocell which is wiredly controlled by coupling to eNB 110 through an optical cable or an optical fiber. Furthermore, RRH 112 may have either a high transmission power, or a low transmission power within a macrocell region. The transmission/reception points eNB 110 and RRH 112 may have the same cell identity (ID) or different cell identities.

Hereinafter, a downlink (DL) may represent communication or a communication path from transmission/reception points 110 and 112 to user equipment 120. An uplink (UL) may represent communication or a communication path from user equipment 120 to transmission/reception points 110 and 112. In the downlink, a transmitter may be a portion of transmission/reception points 110 and 112, and a receiver may be a portion of user equipment 120 and 122. In the uplink, a transmitter may be a portion of user equipment 120, and a receiver may be a portion of transmission/reception points 110 and 112.

Hereinafter, a situation in which a signal is transmitted or received through such channels as PUCCH, PUSCH, PDCCH, and/or PDSCH may be referred to by the expression "transmit or receive PUCCH, PUSCH, PDCCH, and/or PDSCH."

Figure 2:
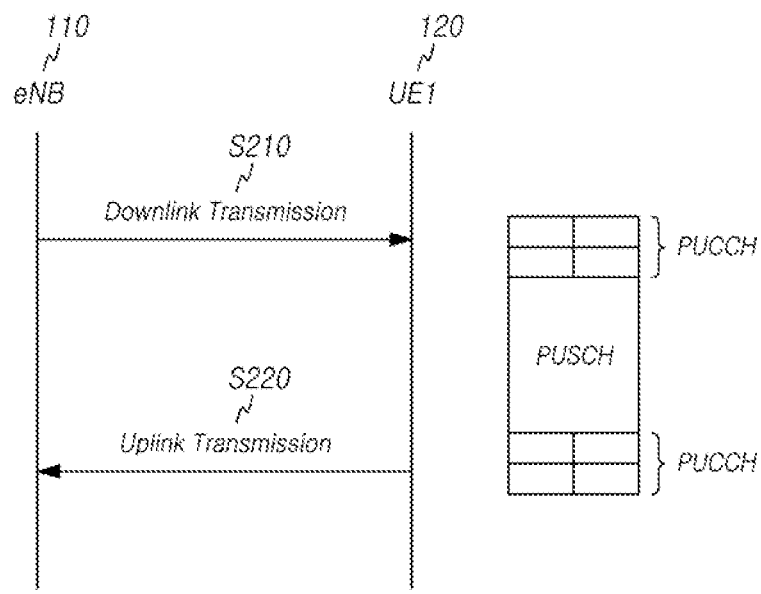
FIG. 2 and FIG. 3 are flow charts illustrating a downlink transmission and an uplink transmission in the wireless communication system shown in FIG. 1.
Figure 3:
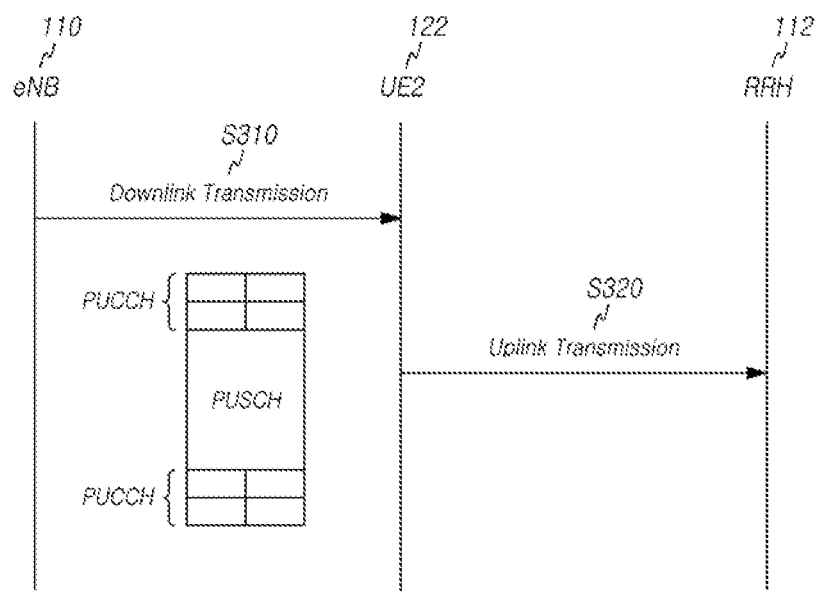

FIG. 2 and FIG. 3 are flowcharts illustrating a downlink transmission and an uplink transmission in the wireless communication system shown in FIG. 1.

Referring to FIG. 2 and FIG. 3, at steps S210 and S310, a first transmission/reception point (e.g., eNB 110) corresponding to one of transmission/reception points (e.g., 110 and 112) may perform a downlink transmission to user equipment 120 and 122. eNB 110 may transmit PDSCH corresponding to a primary physical channel, for unicast transmission. Furthermore, eNB 110 may transmit PDCCH in order to transmit downlink control information, such as scheduling information required for receiving PDSCH, and to transmit scheduling grant information for an uplink data channel (e.g., PUSCH) transmission. Hereinafter, "transmit or receive a signal through a channel" may be referred to as the expression of "transmit or receive a channel."

Referring to FIG. 2, at step 220, UE 1 (120) may perform an uplink transmission to eNB 110 corresponding to the first transmission/reception point. Referring to FIG. 3, at step S320, UE 2 (122) may transmit an uplink signal to a second transmission/reception point (e.g., RRH 112) corresponding to one of transmission/reception points 110 and 112. Alternatively, according to radio environments, UE 1 (120) may perform an uplink transmission to RRH 112, and UE 2 (122) may perform an uplink transmission to eNB 110. The number of user equipment may be "2" or more. In the following embodiments, descriptions will be given under the assumption that one of two user equipment transmits an uplink signal to eNB 110 and the other transmits an uplink signal to RRH 112.

Referring back to FIG. 2 and FIG. 3, UE 1 (120) and UE 2 (122) may transmit a scheduling request (SR), HARQ-ACK associated with received downlink data channel transmission blocks, and/or UE reporting associated with a downlink channel state to the first transmission/reception point (e.g., eNB 110) and the second transmission/reception point (e.g., RRH 112) through an uplink control channel (e.g., PUCCH), respectively. Furthermore, UE 1 (120) and UE 2 (122) may transmit uplink data through an uplink data channel (e.g., PUSCH). UE 1 (120) and UE 2 (122) may transmit a reference signal for demodulation of an uplink channel, such as a demodulation reference signal (DM-RS), to the first transmission/reception point (e.g., eNB 110) and the second transmission/reception point (e.g., RRH 112), respectively.

Hereinafter, in the present specification, UE 1 (120) and UE 2 (122) may be integrally referred to as "user equipment 120." The first transmission/reception point (e.g., eNB 110) and the second transmission/reception point (e.g., RRH 112) may be integrally referred to as "transmission/reception point 110."

The PUCCH may support multiple formats as shown in Table 1 below.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

PUCCH formats 1/1a/1b may be used for transmission of a scheduling request (SR) and HARQ-ACK. PUCCH formats 2/2a/2b may be used for transmission of a channel quality indicator (CQI), a precoding matrix indicator (PMI), and/or a rank indication (RI). PUCCH format 3 may be used for transmission of a plurality of HARQ-ACKs/NACKs.

All PUCCH formats may use a cell-specific cyclic shift (CS), i.e., $n_{cs}^{cell}(n_s,l)$. Herein, $n_{cs}^{cell}(n_s,l)$ may be defined by Formula 1 below, according to symbol number $l$ and slot number $n_s$.

$$n_{cs}^{cell}(n_s,l) = \Sigma_{i=0}^{7} c(8N_{symb}^{UL} \cdot n_s + 8l + i) \cdot 2^i \quad \text{[Formula 1]}$$

In Formula 1, $N_{symb}^{UL}$ represents the total number of single carrier frequency division multiple access (SC-FDMA) symbols used in one uplink slot. $c(i)$ denotes a pseudo-random sequence, and an initial value $c_{init}$ may be a cell identity $N_{ID}^{cell}$. Accordingly, cyclic shift (CS) of PUCCH may be determined based on the cell identity.

Figure 4:
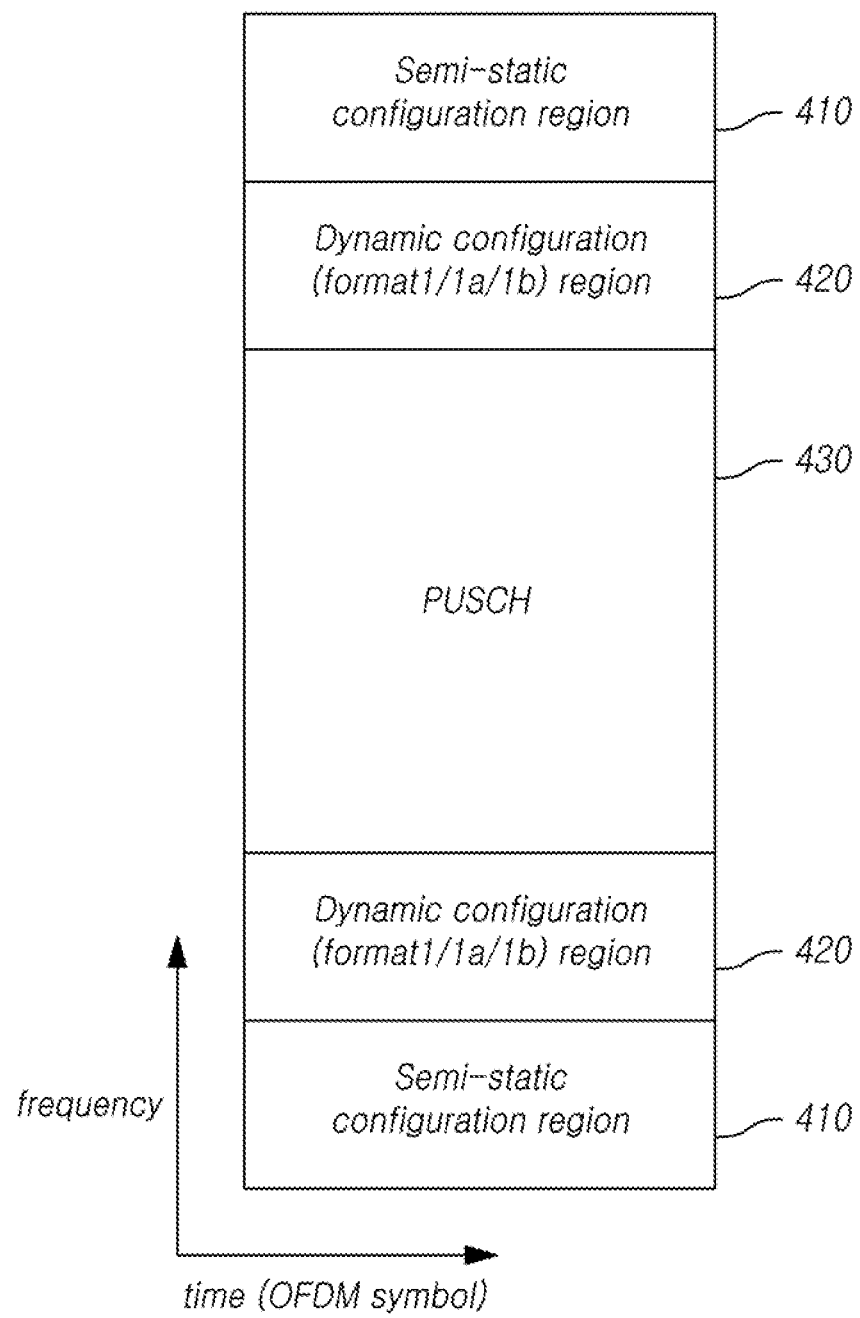
FIG. 4 illustrates mapping of control information depending on each PUCCH format to resource blocks (RBs)

FIG. 4 illustrates mapping of control information depending on each PUCCH format to resource blocks (RBs).

As shown in FIG. 4, physical resource blocks to be used for transmission of PUCCH in slot $n_s$ may be defined by Formula 2 below.

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases} \quad \text{[Formula 2]}$$

In Formula 2, the variable m may depend on the PUCCH format.

For PUCCH formats 1, 1a, and 1b, the variable m may be as follows:

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \frac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \frac{N_{cs}^{(1)}}{8} \right\rceil \end{cases}$$

$$c = \begin{cases} 3 & \text{normal cyclic prefix} \\ 2 & \text{extended cyclic prefix} \end{cases}$$

For PUCCH formats 2, 2a, and 2b, $m=\lfloor n_{PUCCH}^{(2,\tilde{p})}/N_{sc}^{RB}\rfloor$. For format 3, $m=\lfloor n_{PUCCH}^{(3,\tilde{p})}/N_{SF,0}^{PUCCH}\rfloor$.

In Formula 2, $n_{PRB}$ denotes physical resource-block number, $N_{RB}^{UL}$ denotes the number of uplink resource blocks, and $N_{sc}^{RB}$ denotes the number of subcarriers in one resource block. $N_{RB}^{(2)}$ is a value transferred by higher-layer signaling. Herein, $N_{RB}^{(2)} \geq 0$ denotes resource blocks that are available for use by PUCCH formats 2/2a/2b transmission in each slot. $N_{cs}^{(1)}$ denotes the number of cyclic shifts used for PUCCH formats 1/1a/1b in a resource block used for a mix of PUCCH formats 1/1a/1b and 2/2a/2b. The value of $N_{cs}^{(1)}$ is an integer multiple of $\Delta_{shift}^{PUCCH}$. $\Delta_{shift}^{PUCCH}$ may be transferred by higher-layer signaling. Orthogonal resources used for transmission of PUCCH formats 1/1a/1b, 2/2a/2b and 3 may be represented by $$n_{PUCCH}^{(1,\tilde{p})},$$

$$n_{PUCCH}^{(2,\tilde{p})} < N_{RB}^{(2)} N_{sc}^{RB} + \left\lceil \frac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

Referring to Formula 2, at the outermost edges of an uplink bandwidth, resource blocks corresponding to $N_{RB}^{(2)}$ may be used for transmission of PUCCH formats 2/2a/2b. Such information ($N_{RB}^{(2)}$) may be transferred by higher-layer signaling. A maximum of one resource block located in an inner region of the resource blocks for PUCCH formats 2/2a/2b transmission may be used for a mix of PUCCH formats 1/1a/1b and 2/2a/2b. Furthermore, $N_{cs}^{(1)}$ may correspond to a parameter representing the number of orthogonal resources for PUCCH formats 1/1a/1b in such resource block (i.e., in a resource block used for a mix of PUCCH formats 1/1a/1b and 2/2a/2b). Other resource blocks in the inner region may be used for PUCCH formats 1/1a/1b transmission.

In Formula 2, indices of resource blocks for only PUCCH formats 1/1a/1b may increase by "1" per unit of $n_{PUCCH}^{(1,\tilde{p})}$ resources as many times as the value of $c \cdot N_{SC}^{RB}/\Delta_{shift}^{PUCCH}$, for $n_{PUCCH}^{(1,\tilde{p})} \geq c \cdot N_{cs}^{(1)}/\Delta_{shift}^{PUCCH}$ per two slots in one subframe. That is, for each specific subframe to which PUCCH is mapped, the total number of resource indices $n'_{\tilde{p}}(n_s)$ within two resource blocks of a subframe constituted by two slots may be $c \cdot N_{CS}^{RB}/\Delta_{shift}^{PUCCH}$, which represents the number of total resources with orthogonality in resource blocks.

That is $n_{PUCCH}^{(1,\tilde{p})}$ is a parameter representing an index of a corresponding orthogonal resource for antenna index $\tilde{p}$ among total orthogonal resources used for PUCCH formats 1/1a/1b. $n'_{\tilde{p}}(n_s)$ is a parameter representing an index of a corresponding orthogonal resource for antenna index $\tilde{p}$ among total orthogonal resources used in one resource block.

User equipment may receive downlink scheduling information through a legacy PDCCH (may be referred to as "a typical PDCCH") assigned to a control region of resource blocks. Furthermore, the user equipment may obtain corresponding PDSCH assignment information from the received downlink scheduling information. When receiving PDSCH, the user equipment may transmit HARQ ACK/NACK associated with PDSCH (i.e., the HARQ ACK/NACK corresponding to a response to the PDSCH reception). In this case, for each antenna port, PUCCH resource mapping for feedback transmission of the HARQ ACK/NACK may be determined based on a higher-layer parameter (e.g., an RRC parameter) and a control channel element (CCE) index, as described in Formula 3 and Formula 4 below. Herein, the CCE index may be an index of CCE used for transmission of corresponding downlink scheduling information.

$$n_{PUCCH}^{(1,\tilde{p}0)} = n_{CCE} + N_{PUCCH}^{(1)} \quad \text{[Formula 3]}$$

$$n_{PUCCH}^{(1,\tilde{p}1)} = n_{CCE} + 1 + N_{PUCCH}^{(1)} \quad \text{[Formula 4]}$$

Formula 3 and Formula 4 represent PUCCH resources $n_{PUCCH}^{(1,\tilde{p})}$ for HARQ ACK/NACK feedback transmission, in each of antenna port 0 and antenna port 1 of user equipment. Herein, the user equipment may support two antenna port transmission. $n_{CCE}$ represents a lowest CCE index associated with transmission of corresponding downlink scheduling information, and may be dynamically defined. Herein, the lowest CCE index may be an index of the lowest CCE (e.g., the first CCE) used for transmission of the corresponding downlink scheduling information. Alternatively, the lowest CCE index may be a lowest index of the CCEs used for transmission of the corresponding downlink scheduling information.

$N_{PUCCH}^{(1)}$ is a UE-specific parameter configured by higher-layer signaling (e.g., RRC signaling). Furthermore, $N_{PUCCH}^{(1)}$ may be used to determine a starting position of a PUCCH region assigned dynamically, by functioning as an offset for resource allocation associated with PUCCH formats 1/1a/1b.

As described above, in a region for PUCCH formats 2/2a/2b and a mixed region of PUCCH formats 2/2a/2b and PUCCH formats 1/1a/1b, resource blocks may be semi-statically determined by higher-layer signaling. In a region for PUCCH formats 1/1a/1b, resource blocks may be dynamically determined. Accordingly, as described in FIG. 4, uplink transmission resources may be classified into semi-static configuration region 410, dynamic configuration region 420, and PUSCH region 430. Herein, PUCCH formats 1/1a/1b can be configured in dynamic configuration region 420.

A PUCCH resource mapping method according to Formula 3 and Formula 4 described above may be related to a PUCCH resource mapping for HARQ ACK/NACK transmission, in the case that user equipment associated with one serving cell transmits HARQ ACK/NACK using PUCCH formats 1a/1b in a frame structure type 1 (FDD) system. Furthermore, in the case of user equipment associated with at least one serving cell, i.e., the user equipment to which carrier aggregation is applied, PUCCH resource mapping rules may be defined as a function of the lowest CCE index and a higher-layer parameter, as described above. Alternatively, in this case, an ACK/NACK resource indication (ARI) scheme may be used. More specifically, after a plurality of candidate PUCCH resource values are configured by higher-layer signaling in advance, a PUCCH resource value to be used among the candidate PUCCH resource values may be indicated through the information region "transmission power control (TPC) command for PUCCH" of downlink scheduling information.

Figure 5:
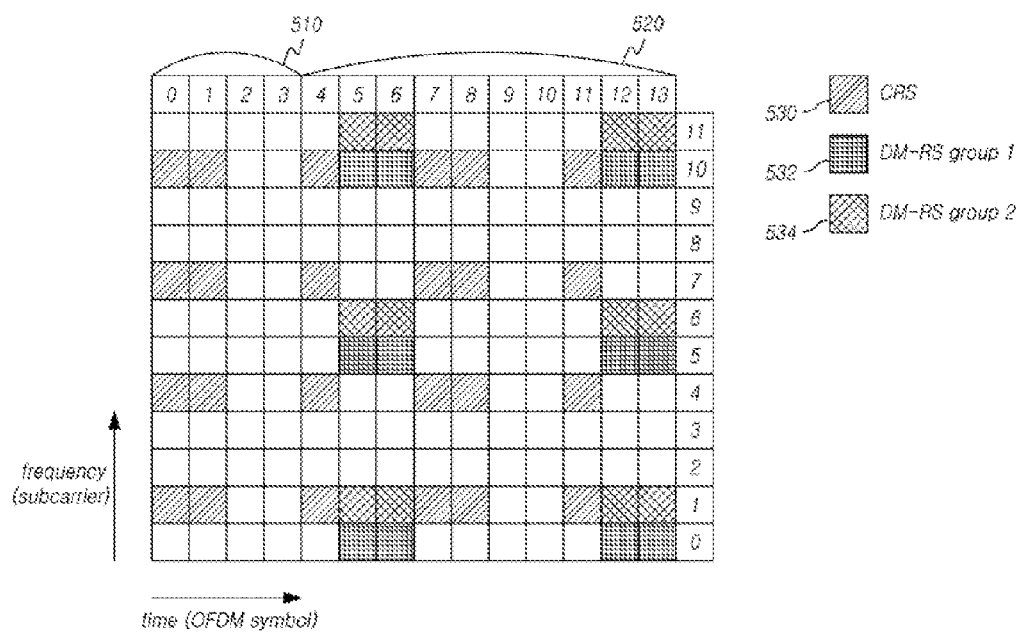
FIG. 5 illustrates one resource-block pair in a downlink subframe in the case of a normal cyclic prefix (normal CP) in a long term evolution (LTE) or LTE-Advanced (LTE-A) system.

FIG. 5 illustrates one resource-block pair in a downlink subframe in the case of a normal cyclic prefix (normal CP) in a long term evolution (LTE) or LTE-Advanced (LTE-A) system.

Referring to FIG. 5, in the case of a normal cyclic prefix (CP), one resource-block pair in a downlink subframe may include 14×12 resource elements (in the case of an extended CP, 12×12 resource elements). Herein, a resource element (RE) may be constituted by one OFDM symbol in the time axis, and by one subcarrier in the frequency axis.

One resource-block pair may include 14 OFDM symbols. Among the 14 OFDM symbols, preceding four OFDM symbols (l=0~3) may correspond to control region 510 assigned for control channels such as a physical control format indicator channel (PCFICH), a physical hybrid ARQ indicator channel (PHICH), a physical downlink control channel (PDCCH), and so forth. The remaining OFDM symbols (l=4~13) may correspond to data region 520 assigned for data channels such as a physical downlink shared channel (PDSCH). Although four OFDM symbols are allocated for control region 510 in FIG. 5, one to four OFDM symbols may be allocated for control region 510, according to embodiments. Information on the size of control region 510 may be transferred through the PCFICH. Herein, the size information may be set as the number of OFDM symbols.

Reference signals may be mapped to specific resource elements of a downlink. That is, a common reference signal (or cell-specific reference signal, hereinafter referred to as "CRS") 530, demodulation reference signals (DM-RS) (or UE-specific reference signals) 532 and 534, a channel-state information reference signal (CSI-RS), and so forth may be transmitted through a downlink. In FIG. 5, only CRS 530 and DM-RSs 532 and 534 have been illustrated for convenience of description.

CRS 530 located in control region 510 may be used to perform a channel estimation for decoding of PDCCH. CRS 530 located in data region 520 may be used for downlink channel measurement. Channel estimation for data decoding of data region 520 may be performed using DM-RSs 532 and/or 534.

Resources of control region 510 may correspond to system overhead, and therefore reduce resources of data region 520 available for data transmission. Meanwhile, In an LTE-A system capable of transmitting data to more users, system capacity enhancement may be restricted due to restricted resources of a typical control region (510). Accordingly, in order to increase control channel resources, considering a method of transmitting/receiving multi-user control channels might be required, such as using a spatial division multiplexing scheme in data region 520. In other words, such method may transmit/receive control channels in data region 520. For example, a control channel transmitted in data region 520 may be referred to as extended PDCCH or enhanced PDCCH (EPDCCH), and is not limited thereto.

In data region 520, control channel resources may be allocated in a unit of resource blocks (or resource-block pairs) for compatibility with data channel resources (e.g., PDSCH resources). In the case of transmitting a control channel in data region 520, DM-RS may be used. Accordingly, the control channel may be transmitted using a beam-forming technique.

In the present description, the expression "assign control information" may have the same meaning as the expression "assign control channel(s)." In other words, in the present description, control channel assignment may mean that control information is assigned to resource elements.

Meanwhile, in an LTE-A system, in the case that EPDCCH is newly adopted (or defined) in a data region (e.g., PDSCH region) in order to improve performance and capacity of a downlink control channel, user equipment may receive downlink scheduling information through the EPDCCH. In this case, there is a need to define a PUCCH resource mapping method such that the user equipment performs a feedback transmission of uplink HARQ-ACK/NACK.

The present embodiment may provide a PUCCH resource mapping method for an uplink HARQ ACK/NACK feedback transmission of user equipment, when the user equipment receives downlink scheduling information through the newly-defined EPDCCH. Particularly, in the case that the user equipment receives downlink control information (DCI) through the EPDCCH, the present embodiment may provide a method of defining an implicitly determined part and an explicitly determined part associated with determination of PUCCH resource mapping for the user equipment. Furthermore, in the case that an ECC index of EPDCCH is used as the implicitly determined part, the present embodiment may provide an ECCE indexing method for a corresponding EPDCCH. Herein, the ECC index of EPDCCH may be conceptually similar to a CCE index of a legacy PDCCH ("a typical PDCCH").

More specifically, user equipment may receive downlink scheduling information through EPDCCH assigned to data region 520 of resource blocks. Furthermore, the user equipment may obtain corresponding PDSCH assignment information from the received downlink scheduling information. When receiving PDSCH, the user equipment may transmit HARQ ACK/NACK corresponding to a response to the PDSCH reception. In this case, for each antenna port, PUCCH resource mapping for feedback transmission of the HARQ ACK/NACK may be performed using PUCCH resource determination components. Herein, the PUCCH resource determination components may include at least one of an implicitly determined parameter $n_{implicit}$ (corresponding to $n_{CCE}$ in Formula 3 and Formula 4) determined based on ECCE, an explicitly determined parameter $N_{explicit}^{(k)}$ (corresponding to $N_{PUCCH}^{(1)}$ in Formula 3 and Formula 4), and an implicitly determined offset $offset_i$.

User equipment may receive downlink scheduling information including PDSCH assignment information, through EPDCCH assigned to data region 520 of resource blocks. Furthermore, when receiving PDSCH, the user equipment may transmit HARQ ACK/NACK corresponding to a response to the PDSCH reception. In this case, for each antenna port, PUCCH resource mapping for feedback transmission of the HARQ ACK/NACK may be determined by Formula 5 and Formula 6 below, respectively.

$$n_{PUCCH}^{(1,\tilde{p}0)} = n_{implicit} + N_{explicit}^{(k)} + offset_i \quad \text{[Formula 5]}$$

$$n_{PUCCH}^{(1,\tilde{p}1)} = n_{implicit} + 1 + N_{explicit}^{(k)} + offset_i \quad \text{[Formula 6]}$$

First, the explicitly determined parameter $N_{explicit}^{(k)}$ corresponding to one of PUCCH resource determination components will be described in more detail.

In at least one embodiment of determining the explicitly determined parameter, user equipment may receive downlink scheduling information for a PDSCH transmission through a legacy PDCCH assigned to a control region. In this case, values of RRC parameter $N_{PUCCH}^{(1)}$ may be identically applied to all user equipment in a corresponding cell, for uplink HARQ ACK/NACK resource mapping. Herein, the values of RRC parameter $N_{PUCCH}^{(1)}$ may be transmitted from a transmission/reception point (e.g., a base station or eNB) by UE-specific higher-layer signaling.

User equipment may be configured to receive downlink scheduling information for a PDSCH transmission, through EPDCCH. In a method of uplink HARQ ACK/NACK resource mapping for the user equipment according to the present embodiment, values corresponding to $N_{explicit}^{(k)}$ in Formula 5 and Formula 6 described above may be determined according to a following first method. The first method may determine $N_{explicit}^{(k)}$ values, by reusing UE-specific RRC parameter $N_{PUCCH}^{(1)}$ associated with a typical user equipment to which an above-described legacy PDCCH is applied.

Like a typical user equipment received DCI through a legacy PDCCH, even user equipment configured to receive DCI through EPDCCH may receive system information from a base station. Accordingly, in the case of PUCCH resource mapping for an uplink HARQ ACK/NACK transmission, $N_{PUCCH}^{(1)}$ values included in the received system information may be used as $N_{explicit}^{(k)}$ in Formula 5 and Formula 6.

In other embodiments of determining an explicitly determined parameter, in the case of user equipment configured to receive DCI through EPDCCH, the explicitly determined parameter $N_{explicit}^{(k)}$ described above may be independently determined for each user equipment, by UE-specific higher-layer signaling.

In other words, in the case that a certain user equipment is configured to receive DCI through EPDCCH, a corresponding transmission/reception point may transmit values of the explicitly determined parameter $N_{explicit}^{(k)}$ for the corresponding user equipment. Accordingly, the user equipment may perform PUCCH resource mapping according to Formula 5 and Formula 6, based on the explicitly determined parameter.

In still other embodiments determining an explicitly determined parameter, in the case that a certain user equipment is configured to receive DCI through EPDCCH, a n number of explicitly determined parameters $N_{explicit}^{(k)}$ (k=0 to n−1) (i.e., $N_{explicit}^{(0)}$, $N_{explicit}^{(1)}$, explicit..., $N_{explicit}^{(n-1)}$) may be configured by UE-specific higher-layer signaling for the certain user equipment. Thereafter, in the case that downlink scheduling information for a corresponding user equipment is transmitted, a parameter to be applied to PUCCH resource mapping among the n number of parameters described above may be indicated. Herein, the PUCCH resource mapping may be performed for HARQ ACK/NACK feedback transmission.

In order to accomplish such embodiment, information field for indication of ACK/NACK resources may be newly defined in downlink scheduling information. Herein, the information field may have a size of M bits, where M=log n (n≤$2^M$). Alternatively, an existing information region ("information field") of the downlink scheduling information for a corresponding user equipment may be used for indication of corresponding ACK/NACK resources. For example, an existing information region for 'TPC command for PUCCH' may be used for indication of ACK/NACK resources. Furthermore, in this case, if n=4 in $N_{explicit}^{(k)}$ (k=0 to n−1), explicitly determined parameters $N_{explicit}^{(k)}$ (k=0 to n−1) may be determined as shown in Table 2 below.

TABLE 2

| Value of 'TPC command for PUCCH' | $N_{explicit}^{(k)}$ |
|---|---|
| '00' | The 1$^{st}$ PUCCH resource value configured by the higher layers, $N_{explicit}^{(0)}$ |
| '01' | The 2$^{nd}$ PUCCH resource value configured by the higher layers, $N_{explicit}^{(1)}$ |
| '10' | The 3$^{rd}$ PUCCH resource value configured by the higher layers, $N_{explicit}^{(2)}$ |
| '11' | The 4$^{th}$ PUCCH resource value configured by the higher layers, $N_{explicit}^{(3)}$ |

For example, in the case of n=4, values of "TPC command for PUCCH" information region may have a length of 2 bits. In this case, when such value is '10', $N_{explicit}^{(2)}$ may be applied as $N_{explicit}^{(k)}$ in Formula 5 and Formula 6 as described above.

Alternatively, indication of ACK/NACK resources associated with candidate parameters, e.g., $N_{explicit}^{(k)}$ may be performed by using other information regions of downlink scheduling information for a corresponding user equipment, other than "TPC command for PUCCH" information region. Herein, the candidate parameters, e.g., $N_{explicit}^{(k)}$ explicit may be assigned through UE-specific higher-layer signaling.

Hereinafter, the implicitly determined parameter $n_{implicit}$ corresponding to one of the PUCCH resource determination components will be described in more detail.

Figure 6:
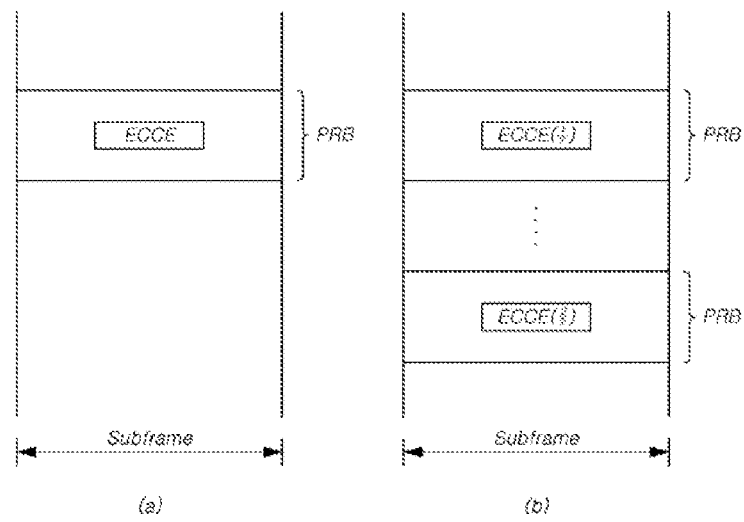
FIG. 6 illustrates two types of EPDCCH transmissions including a localized EPDCCH transmission and a distributed EPDCCH transmission.

In connection with at least one embodiment of determining the implicitly determined parameter, FIG. 6 illustrates two types of EPDCCH transmissions. Herein, the two types of EPDCCH transmissions may include a localized EPDCCH transmission and a distributed EPDCCH transmission.

The number of downlink physical resource blocks (PRBs) may be referred to as $N_{PRB}$. Herein, the downlink PRBs may constitute a system bandwidth supported in a certain cell configured by communication providers. EPDCCH may be transmitted through a corresponding PDSCH region. In this case, a transmission type of the EPDCCH may correspond to one of a localized EPDCCH transmission and a distributed EPDCCH transmission, as shown in FIGS. 6a and 6b. Accordingly, an ECCE structure and the number of resource elements (REs) constituting one ECCE may differ according to each EPDCCH transmission type. Alternatively, the ECCE structure and the number of resource elements (REs) per ECCE may be the same regardless of EPDCCH transmission types.

The localized EPDCCH transmission as shown in FIG. 6a may mean that one ECCE is located and transmitted in one resource-block pair. The distributed EPDCCH transmission as shown in FIG. 6b may mean that one ECCE is located and transmitted in at least two resource-block pairs.

An ECCE may correspond to a specific number of enhanced resource-element groups (EREGs). Each EREG may represent a specific number of available REs. Accordingly, the ECCE may mean a set of REs available for EPDCCH transmission. The number of ECCEs required for a specific EPDCCH may differ depending on a size of control information (DCI payload) and a channel-coding rate. Herein, the number of ECCEs necessary for the specific EPDCCH may be referred to as an aggregation level (AL).

In the present specification, the number of EREGs constituting an ECCE for a localized EPDCCH transmission may be referred to as $N_{EREG, L}$, and the number of EREGs constituting an ECCE for a distributed EPDCCH transmission may be referred to as $N_{EREG, D}$. The maximum number of EREGs available for EPDCCH transmission in one PRB or one virtual resource block (VRB) may be referred to as $N_{RB, EREG}$. Accordingly, in the case of the localized EPDCCH transmission, the number of ECCEs to be transmitted through a corresponding PRB (or VRB) may be $[N_{RB\ EREG}/N_{EREG, L}]$. In the case of the distributed EPDCCH transmission, the number of ECCEs to be transmitted through a corresponding PRB (or VRB) may be $[N_{RB\ EREG}/N_{EREG, D}]$. That is, in the case that the number of RBs used for other downlink physical signals and physical channels in a corresponding PRB (or VRB) is minimal, the maximum number of ECCEs to be transmitted through the corresponding PRB may be $[N_{RB,EREG}/N_{EREG, L}]$ or $[N_{RB,EREG}/N_{EREG, D}]$ according to EPDCCH transmission types as described above. In other words, in a certain localized EPDCCH set, the number of ECCEs constituted by one PRB or VRB may be $N_{ECCE, L}$ $(=[N_{RB,\ EREG}/N_{EREG, L}])$. Meanwhile, in a certain distributed EPDCCH set, the number of ECCEs constituted by one PRB or VRB may be $N_{ECCE, D}$ $(=[N_{RB, EREG}/N_{EREG, D}])$.

Accordingly, a certain user equipment may use the lowest PRB (or VRB) index as $n_{implicit}$ value in a PUCCH resource mapping formula for HARQ ACK/NACK feedback. Herein, the lowest PRB (or VRB) index may represent an index of a lowest PRB (or VRB) among the PRBs (or VRBs) used for EPDCCH transmission to user equipment, in a localized or distributed EPDCCH set configured for the user equipment. Furthermore, PRBs (VRBs) may be indexed in the order of increasing frequency. More specifically, a localized or distributed EPDCCH set may be configured by an X number of RB pairs in a subframe assigned for a certain user equipment. Herein, the X is a natural number which is greater than or equal to "1" and is less than or equal to the number of RBs per downlink bandwidth. Indexing associated with the PRBs of the EPDCCH set may be sequentially performed from the lowest PRB. That is, the PRBs of the EPDCCH set may be numbered (i.e., indexed) from 0 to X−1. In the case that an index of a lowest PRB among the PRBs used for EPDCCH transmission to user equipment is defined as $n_{PRB}$ (where, $n_{PRB}$ is an integer satisfying $0 \le n_{PRB} \le X-1$), the $n_{PRB}$ may be used for PUCCH resource mapping for ACK/NACK feedback transmission on PUCCH. For example, in the case that a corresponding EPDCCH is configured for the localized EPDCCH transmission, $n_{implicit}$ in Formula 5 and Formula 6 may correspond to $n_{PRB}*[N_{RB,\ EREG}/N_{EREG, L}]=n_{PRB}*N_{ECCE, L}$. Herein, Formula 5 and Formula 6 are associated with PUCCH resource mapping for an uplink HARQ ACK/NACK feedback transmission of a corresponding user equipment. In the case that a corresponding EPDCCH is configured for the distributed EPDCCH transmission, $n_{implicit}$ may correspond to $n_{PRB}*[N_{RB,\ EREG}/N_{EREG, D}]=n_{PRB}*N_{ECCE, D}$. Meanwhile, $N_{ECCE, L}$ and $N_{ECCE, D}$ may be applied for $n_{implicit}$. Herein, $N_{ECCE, L}$ represents the number of ECCEs configured by one PRB in a certain localized EPDCCH set, and $N_{ECCE, D}$ represents the number of ECCEs configured by one PRB in a certain distributed EPDCCH set. Accordingly, in the case that a corresponding EPDCCH is configured for the localized EPDCCH transmission, $n_{implicit}$ in Formula 5 and Formula 6 associated with PUCCH resource mapping for an uplink HARQ ACK/NACK feedback transmission of a corresponding user equipment may correspond to $n_{PRB}*N_{ECCE, L}$. In the case that a corresponding EPDCCH is configured for the distributed EPDCCH transmission, $n_{implicit}$ may correspond to $n_{PRB}*N_{ECCE, D}$.

In summary, a lowest PRB index may be used as one resource determination component, when PUCCH resource mapping is performed for ACK/NACK feedback associated with PDSCH assigned according to downlink scheduling information. Herein, the lowest PRB index may represent a lowest index of PRBs used for transmission of control information among an X number of PRBs (or VRBs) constituting an EPDCCH set. Alternatively, the lowest PRB index may be defined as an index of the a lowest PRB (e.g., a first PRB) used for transmission of control information. More specifically, a product of the lowest PRB index and the number of ECCEs configured in each PRB (i.e., the number of ECCEs per PRB) may be used as a resource determination component, in the case of a PUCCH resource mapping for ACK/NACK feedback associated with PDSCH assigned according to the downlink scheduling information. Herein, the EPDCCH set may be either a localized EPDCCH set or a distributed EPDCCH set.

In other embodiments of determining an implicitly determined parameter, a certain user equipment may receive downlink scheduling information through EPDCCH assigned to data region 520 of resource blocks. In the case, $n_{implicit}$ in Formula 5 and Formula 6 may be determined as a function of the number of blind decoding attempted until user equipment receives corresponding downlink scheduling information. Herein, Formula 5 and Formula 6 may be associated with PUCCH resource mapping for an uplink HARQ ACK/NACK feedback transmission of a corresponding user equipment. For example, if user equipment receives corresponding downlink scheduling information through $N^{th}$ blind decoding, "N" may be applied as the above-described $n_{implicit}$.

For such embodiment, a blind decoding procedure for user equipment configured to receive DCI through EPDCCH is necessary to be defined. Accordingly, as an EPDCCH blind decoding procedure of a corresponding user equipment, a blind decoding method dependent on EPDCCH transmission types (i.e., "an EPDCCH transmission type dependent blind decoding method") may be defined.

In the case of user equipment for which a certain EPDCCH is configured, both an EPDCCH search space of a distributed type (hereinafter, referred to as "a distributed EPDCCH search space") and an EPDCCH search space of a localized type (hereinafter, referred to as "a localized EPDCCH search space") may be configured for the user equipment. In this case, a blind decoding may be performed in the distributed EPDCCH search space in advance, and then be performed in the localized EPDCCH search space. More specifically, in this case, the user equipment may perform a blind decoding in order of ECCE aggregation levels 1, 2, 4, 8, and so forth, in the distributed EPDCCH search space. Thereafter, the user equipment may change a search space into the localized EPDCCH search space, and then perform a blind decoding in order of ECCE aggregation levels 1, 2, 4, 8, and so forth, in the distributed EPDCCH search space. Such blind decoding scheme may be simply referred to as a 'distributed EPDCCH search space'-first scheme. Alternatively, a blind decoding procedure of user equipment may be defined such that a blind decoding in the localized EPDCCH search space can be performed in advance. Such blind decoding scheme may be simply referred to as a 'localized EPDCCH search space'—first scheme.

In still other embodiments, a blind decoding method dependent on aggregation levels (i.e., "an aggregation level dependent blind decoding method") may be defined. In this case, a blind decoding may be performed in order of ECCE aggregation levels 1, 2, 4, 8, and so forth. More specifically, in the case that both a distributed EPDCCH search space and a localized EPDCCH search space are configured in user equipment, a blind decoding may be performed in order of aggregation levels from a lower aggregation level to a higher aggregation level. For example, a blind decoding may be performed in a distributed EPDCCH search space at aggregation level 1, and then be performed in a localized EPDCCH search space at aggregation level 1. Thereafter, even in the case of aggregation levels 2, 4, 8, and so forth, the blind decoding may be identically performed according to the 'distributed EPDCCH search space'-first scheme. Alternatively, a blind decoding may be defined such that the blind decoding is performed in an opposite order, i.e., according to a 'higher aggregation level'-first scheme. Herein, the 'higher aggregation level'-first scheme may mean that the blind decoding is performed in order of aggregation levels from a higher aggregation level to a lower aggregation level.

In the above case, a corresponding blind decoding order may be applied to only downlink scheduling information. Particularly, the decoding order associated with DCI format 1A corresponding to fallback downlink scheduling information of downlink scheduling information may be determined in advance, according to rules described above. Thereafter, the decoding order associated with a PDSCH transmission mode dependent DCI format may be subsequently determined.

In still other embodiments of determining an implicitly determined parameter, in the case of user equipment configured to receive DCI through EPDCCH, ECCE indexing may be performed for each user equipment, in a search space configured UE-specifically. Furthermore, a lowest ECCE index associated with transmission of downlink scheduling information may be applied as a value of $n_{implicit}$ described above. Herein, the lowest ECCE index may be a lowest index of ECCEs used for transmission of the downlink scheduling information. Alternatively, the lowest ECCE index may be an index of the lowest ECCE (e.g., the first ECCE) used for transmission of the downlink scheduling information.

In a similar manner to the above-described embodiment in which a value of $n_{implicit}$ is determined as a function of the number of blind decoding, ECCE indices may be separately defined for each search space configured according to EPDCCH transmission types. That is, in the case of an EPDCCH search space for a certain user equipment, an M number of PRBs may be allocated (or configured) as a distributed EPDCCH search space. Herein, the M may be a natural number which is greater than or equal to "1" and is less than or equal to the number of PRBs per downlink bandwidth. Furthermore, an L number of PRBs may be allocated (or configured) as a localized EPDCCH search space. Herein, the L may be a natural number which is greater than or equal to "1" and is less than or equal to the number of PRBs per downlink bandwidth. In this case, $n_{ECCE,D}$ and $n_{ECCE,L}$ may be determined according to M and L values, respectively. Herein, $n_{ECCE,D}$ may represent the number of ECCEs created in the distributed EPDCCH search space according to an M value. $n_{ECCE,L}$ may represent the number of ECCEs created in the localized EPDCCH search space according to an L value. Accordingly, in an ECCE indexing method of a corresponding user equipment, ECCEs constituting the distributed EPDCCH search space may be numbered (or indexed) from 0 to $n_{ECCE,D}-1$ (i.e., $0\sim(n_{ECCE,D}-1)$). Subsequently, ECCEs constituting the localized EPDCCH search space may be numbered from $n_{ECCE,D}$ to $n_{ECCE,D}+n_{ECCE,L}-1$ (i.e., in order of $n_{ECCE,D}\sim(n_{ECCE,D}+n_{ECCE,L}-1)$).

In still other embodiments, ECCE indexing of a distributed EPDCCH search space and a localized EPDCCH search space may be separately performed. In this case, ECCEs constituting the distributed EPDCCH search space may be numbered from 0 to $n_{ECCE,D}-1$ (i.e., $0\sim(n_{ECCE,D}-1)$). Meanwhile, ECCEs constituting the localized EPDCCH search space may be independently numbered from 0 to $n_{ECCE,L}-1$ (i.e., in order of $0\sim(n_{ECCE,L}-1)$).

In addition, EPDCCH or ECCE indexing may be separately performed according to EPDCCH transmission types for a certain user equipment. Alternatively, in the case that a plurality of EPDCCH sets are assigned for a certain EPDCCH transmission type, EPDCCH or ECCE indexing may be separately performed per EPDCCH set. In other words, in this case, the EPDCCH or ECCE indexing may be performed within a corresponding EPDCCH set. Herein, each of the plurality of EPDCCH sets may be constituted by a group of 'X' PRBs. The X is a natural number which is greater than or equal to "1" and is less than or equal to the number of PRBs per downlink bandwidth. The number ("X") of PRBs constituting one EPDCCH set may be X=(1), 2, 4, or 8 for a localized type, and X=2, 4, 8, or (16) for a distributed type.

For example, in the case of user equipment (e.g., UE 1) configured to receive DCI through EPDCCH, a $K_L$ number of EPDCCH sets may be assigned for a localized EPDCCH search space, and a $K_D$ number of EPDCCH sets may be assigned for a distributed EPDCCH search space. Herein, the $K_L$ number of EPDCCH sets may include EPDCCH set #1 through EPDCCH set #$K_L$. The $K_D$ number of EPDCCH sets may include EPDCCH set #1 through EPDCCH set #$K_D$. In this case, indexing of ECCEs constituting EPDCCH set #n of a localized type may be performed in order of $0\sim(X_{Ln}*N-1)$ for n=1, . . . , or $K_L$. Indexing of ECCEs constituting EPDCCH set #m of a distributed type may be performed in order of $0\sim(X_{Dm}*N-1)$ for m=1, . . . , or $K_D$. Herein, in the case of each localized EPDCCH set (n=1, . . . , or $K_L$), $X_{Ln}$ may represent the number ("X") of PRBs constituting a corresponding localized EPDCCH set #n, as described above. In the case of each distributed EPDCCH set (m=1, . . . , or $K_D$), $X_{Dm}$ may represent the number ("X") of PRBs constituting a corresponding distributed EPDCCH set #m.

Furthermore, N may represent the number of ECCEs constituting one PRB in a corresponding subframe. More specifically, N may be 2 (N=2) or 4 (N=4) according to the number of EREG constituting one ECCE in the corresponding subframe. Herein, in the case that eight EREGs constitute one ECCE, N=2. In the case that four EREGs constitute one ECCE, N=4.

Figure 7:
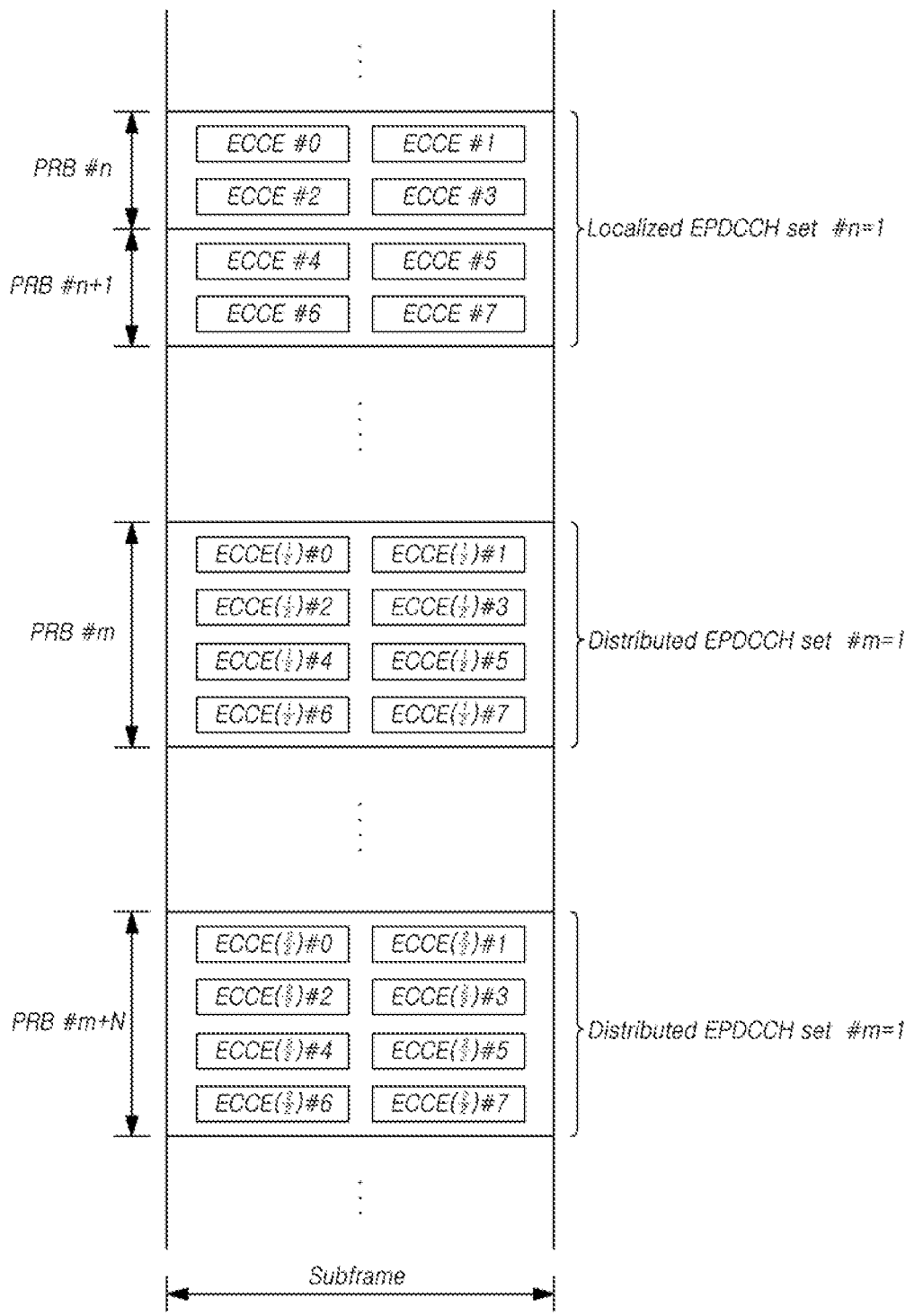
FIG. 7 illustrates a localized EPDCCH set for $K_L=1$ and a distributed EPDCCH for $K_D=1$ in the case of X=2 and N=4.

FIG. 7 illustrates one localized EPDCCH set for $K_L=1$ and one distributed EPDCCH for $K_D=1$ in the case of X=2 and N=4.

Referring to FIG. 7, in the case of X=2 and N=4, ECCE indexing may be separately performed between the one localized EPDCCH set for $K_L=1$ and the one distributed EPDCCH for $K_D=1$.

As shown in FIG. 7, ECCEs constituting the one localized EPDCCH set may be numbered (or, indexed) from ECCE #0 to ECCE #7. In this case, because of the localized EPDCCH set, one ECCE may be located in one PRB pair. For example, all of ECCE #0, i.e., all EREGs constituting the ECCE #0 may be located in the same PRB #n.

As shown in FIG. 7, ECCEs constituting the one distributed EPDCCH set may be numbered from ECCE #0 to ECCE #7. In this case, because of the distributed EPDCCH set, one ECCE may be distributedly located in two PRB pairs. For example, a half of ECCE #0 (i.e., ECCE (1/2) #0) may be located in PRB #m, the other half of ECCE #0 (i.e., ECCE (2/2) #0) may be located in PRB #m+N. Herein, ECCE (1/2) #0 may represent a half of the EREGs constituting ECCE #0, and ECCE (1/2) #0 may represent the other half of the EREGs constituting ECCE #0.

An ECCE indexing for one localized EPDCCH set may be performed according to the following indexing order. First, ECCE indexing may be sequentially performed from an ECCE located at a lowest frequency position, according to frequency positions constituting each ECCE. Second, in the case that a corresponding EPDCCH set is constituted by a PRB group (including an X number of PRBs), ECCE indexing may be sequentially performed from an ECCE configured by lowest subcarrier indices of a lowest-indexed PRB. Herein, the lowest-indexed PRB may be a PRB (e.g., a lowest PRB) having the lowest PRB index in an EPDCCH set. In this case, ECCEs may be numbered from 0 to $(X_{Lm}*N-1)$. Third, in the case that a corresponding EPDCCH set is constituted by a PRB group (including an X number of PRBs) and each ECCE is constituted by EREGs, ECCE indexing may be sequentially performed from an ECCE having the smallest index value of lowest EREG indices of respective ECCEs, in the lowest-indexed PRB. In this case, corresponding ECCEs may be numbered from 0 to $(X_{Lm}*N-1)$. Fourth, in the case that a corresponding EPDCCH set is constituted by a PRB group (including an X number of PRBs) and each ECCE is constituted by EREGs, ECCE indexing may be sequentially performed from an ECCE having a smallest EREG index sum in the lowest-indexed PRB. Herein, the smallest EREG index sum represents the smallest value of EREG index sums calculated in respective ECCEs. In this case, corresponding ECCEs may be numbered from 0 to $(X_{Lm}*N-1)$). Meanwhile, ECCE indexing for one distributed EPDCCH set may be performed in the same indexing order as the localized EPDCCH set described above.

In still other embodiments of determining an implicitly determined parameter, in the case of user equipment configured to receive DCI through EPDCCH, ECCE indexing may be performed for each user equipment, in a search space configured UE-specifically. Furthermore, a lowest ECCE index associated with transmission of downlink scheduling information may be applied to a value of $n_{implicit}$ described above. Herein, the lowest ECCE index may be a lowest index of the ECCEs used for transmission of the downlink scheduling information. Alternatively, the lowest ECCE index may be an index of the lowest ECCE (e.g., the first ECCE) used for transmission of the downlink scheduling information.

In an ECCE indexing method for such embodiments, in the case of user equipment configured to receive DCI through EPDCCH, ECCE indexing may be performed according to an assigned resource block (or assigned resource blocks) and/or EPDCCH transmission types associated with a corresponding resource block (or corresponding resource blocks). Herein, the assigned resource block (or assigned resource blocks) may represent a resource block (or resource blocks) assigned for EPDCCH transmission for a corresponding user equipment.

For example, in the case that the maximum number of 'localized ECCEs' (i.e., ECCEs of localized types) transmitted through one PRB is referred to as $L_{max}$, corresponding $L_{max}$ may be determined according to $L_{max}=[N_{RB,EREG}/N_{ECCE,L}]$, as described in embodiments determining an implicitly determined parameter.

In such case, a 'k' number of consecutive PRBs (or VRBs) from PRB (or VRB) #n to PRB (or VRB) #(n+k-1) may be assigned for localized EPDCCH transmission for a certain user equipment. When the number of localized ECCEs defined through the k number of PRBs (or VRBs) is defined as $K_{eCCE,L}$ ($\leq k \cdot L_{max}$), localized ECCE indexing for corresponding PRBs (or VRBs) may be sequentially performed from a lowest ECCE. Accordingly, localized ECCEs may be numbered from $n \cdot L_{max}$ to $(n \cdot L_{max}+K_{eCCE,L}-1)$.

Alternatively, an 'm' number of distributive or consecutive PRBs (or VRBs) may be assigned for distributed EPDCCH transmission for a corresponding user equipment. In this case, when the number of distributed ECCEs defined through corresponding PRBs (or VRBs) is defined as $K_{eCCE,D}$($\leq m \cdot L_{max}$), distributed ECCE indexing for corresponding PRBs (or VRBs) may be sequentially performed from a lowest ECCE. Accordingly, distributed ECCEs may be numbered from 0 to ($K_{eccE,D}-1$).

In addition, methods of determining a variety of implicitly determined parameters described above may be differently applied according to types (localized type or distributed type) of EPDCCH sets. Such modified methods may be included in the scope of the present embodiment. For example, in the case that EPDCCH for a corresponding user equipment is transmitted through a distributed EPDCCH set (i.e., an EPDCCH of distributed type), a lowest ECCE index may be used as an implicitly determined parameter in resource mapping formulas (or equations). Herein, the lowest ECCE index may be a lowest index of the ECCEs used for transmission of a corresponding EPDCCH. Alternatively, the lowest ECCE index may be an index of a lowest ECCE (e.g., a first ECCE) among the ECCEs used for transmission of the corresponding EPDCCH. The resource mapping formulas (or equations) may be associated with a PUCCH transmission resource mapping for HARQ ACK/NACK feedback of the corresponding user equipment. Meanwhile, in the case that EPDCCH for a corresponding user equipment is transmitted through a localized EPDCCH set (i.e., an EPDCCH of localized type), a product of 'a lowest PRB index' and 'the number of ECCEs configured in each PRB' (i.e., the number of ECCEs per PRB) may be used as an implicitly determined parameter in resource mapping formulas (or equations), i.e., formulas (or equations) associated with a PUCCH transmission resource mapping for HARQ ACK/NACK feedback of the corresponding user equipment.

Hereinafter, an implicitly determined offset $offset_i$ corresponding to one of PUCCH resource determination components will be described in more detail.

In at least one embodiment of determining an implicitly determined offset, in the case of user equipment configured to receive DCI through EPDCCH, the implicitly determined offset $offset_i$ in addition to an implicitly determined parameter and an explicitly determined parameter may be adopted (or introduced) in PUCCH resource mapping functions for HARQ ACK/NACK feedback of the user equipment. In the case that the implicitly determined offset $offset_i$ is adopted, a value of $offset_i$ may be determined as values of a function using a parameter subset as a parameter. Herein, the parameter subset may be a subset of parameters such as DM-RS antenna port number of low ECCEs transmitting downlink scheduling information for a corresponding user equipment, aggregation levels, C-RNTI of the corresponding user equipment, system bandwidth of a corresponding cell, $N_{PRB}$, and so forth.

In at least one embodiment of determining the implicitly determined offset, a hashing function may be reused. Herein, the hashing function may determine a UE-specific search space for an existing legacy PDCCH (located in a control region) at each aggregation level. A search space of user equipment according to an aggregation level (AL) may be determined by the hashing function such as $L\{(Y_k+m') \bmod \lfloor N_{CCE,k}/L \rfloor\}+i$ or $L\{(Y_k+m') \bmod \lfloor N_{CCE,k}/L \rfloor\}$. In the present embodiment, such hashing functions may be applied by changing $N_{CCE,k}$ into $N_{PRB}$. Herein, $N_{CCE,k}$ denotes the total number of CCEs of PDCCH in a certain subframe k. $Y_k$ may be a variable defined according to aggregation levels of a common search space or a UE-specific search space. m' may be determined based on the number of PDCCH candidates and a carrier indicator field value. L denotes an aggregation level (AL). i=0, . . . , L−1.

Furthermore, the implicitly determined offset $offset_i$ may differ according to whether a common search space (CSS) for a corresponding user equipment is configured in either a legacy PDCCH region or an EPDCCH region. Herein, the legacy PDCCH region may be located in a control region. For example, in the case that the common search space (CSS) of the legacy PDCCH is reused, the number of CCEs constituting a corresponding legacy PDCCH, e.g., 16 may be added to an $offset_i$ value.

Hereinbefore, a variety of embodiments associated with PUCCH resource determination components have been described. More specifically, in the case of PUCCH resource mapping used for HARQ ACK/NACK feedback for each antenna port, the PUCCH resource determination components may include at least one of an implicitly determined parameter $n_{implicit}$, an explicitly determined parameter $N_{explicit}^{(k)}$, and an implicitly determined offset $offset_i$.

Furthermore, in the case of PUCCH resource mapping used for HARQ ACK/NACK feedback for each antenna port, methods of control information transmission and/or resource mapping, and apparatus thereof according to the present embodiment may include any and all combinations of one or more PUCCH resource determination component.

More specifically, ECCE indexing may be separately performed per EPDCCH set. In this case, a lowest ECCE index associated with transmission of downlink scheduling information may be applied as an implicitly determined parameter $n_{implicit}$ corresponding to one of PUCCH resource determination components. Herein, the lowest ECCE index may be a lowest index of the ECCEs used for transmission of downlink scheduling information. Alternatively, the lowest ECCE index may be an index of the lowest ECCE (e.g., the first ECCE) used for transmission of downlink scheduling information.

Figure 8:
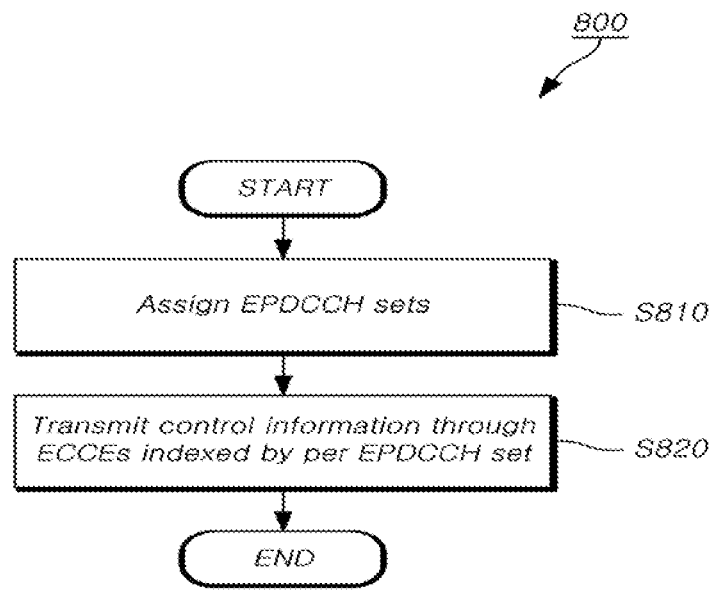
FIG. 8 is a flowchart illustrating a method of transmitting control information for a specific user equipment through a data region of physical resource-block (PRB) pairs in a subframe in a transmission/reception point in accordance with at least one embodiment.

FIG. 8 is a flowchart illustrating a method of transmitting control information for a specific user equipment through a data region of physical resource-block (PRB) pairs in a subframe in a transmission/reception point in accordance with at least one embodiment.

Referring to FIG. 8, a transmission/reception point according to the present embodiment may perform a method (800) of transmitting control information for a specific user equipment through a data region of physical resource-block (PRB) pairs in a subframe. More specifically, at step S810, the transmission/reception point may assign at least one enhanced physical downlink control channel (EPDCCH) set. Herein, each EPDCCH set may be constituted by an X number of PRB pairs in the subframe. The X number may be a natural number which is greater than or equal to "1" and is less than or equal to the number of RBs per downlink bandwidth. At step S820, the transmission/reception point may transmit the control information to the specific user equipment through at least one of at least two ECCEs indexed separately per EPDCCH set. In the case of the X number of PRB pairs constituting one EPDCCH set, the X may be 2, 4, 8, (16), or (32) (i.e., X=2, 4, 8, (16), or (32)), and is not limited thereto. One EPDCCH set may or may not be constituted by a maximum of 16 PRB pairs according to type of the EPDCCH set. For example, a distributed EPDCCH set may be constituted by 16 PRB pairs. However, a localized EPDCCH set may be constituted by a maximum of 8 PRB pairs.

Figure 9:
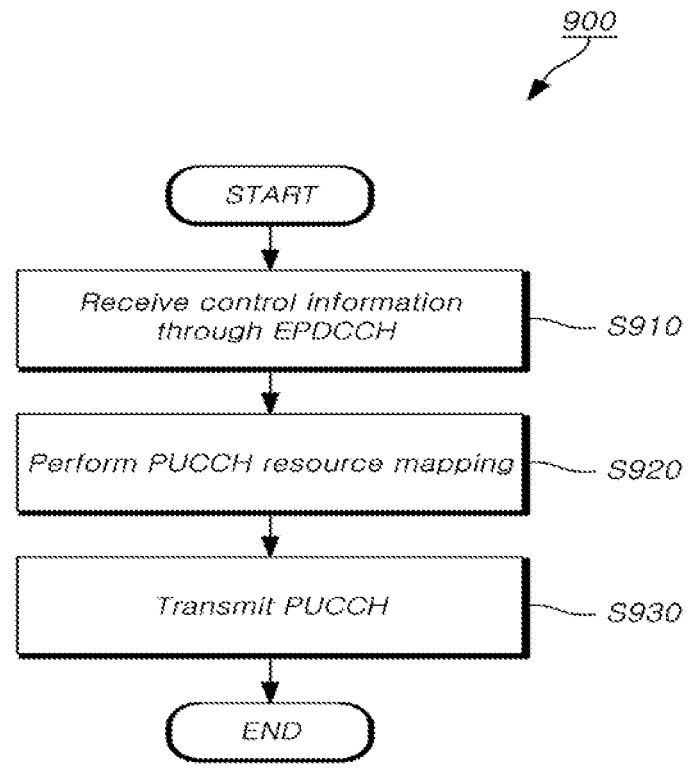
FIG. 9 is a flowchart illustrating a method of mapping PUCCH resources by user equipment receiving downlink scheduling information through EPDCCH in accordance with other embodiments.

FIG. 9 is a flowchart illustrating a method of mapping PUCCH resources by user equipment receiving downlink scheduling information through EPDCCH in accordance with other embodiments.

Referring to FIG. 9, the user equipment according to the present embodiment may perform an uplink control channel resource mapping method (900) of the user equipment. More specifically, at step S910, the user equipment may receive control information including a downlink scheduling information through at least one of at least two ECCEs from a transmission/reception point. Herein, the at least two ECCEs may be indexed separately per each of at least one EPDCCH set, the each EPDCCH set is constituted by an X number of PRB pairs of a subframe, and the X is a natural number greater than "1". At step S920, the user equipment may perform a PUCCH resource mapping for an ACK/NACK, using a lowest ECCE index as a resource determination component. Herein, the lowest ECCE index may be a lowest index of at least one ECCE used for reception of the control information. More specifically, the lowest ECCE index may be an index of a lowest ECCE (e.g., a first ECCE) used for reception of the control information. The ACK/NACK may correspond to a response signal associated with a PDSCH assigned according to the downlink scheduling information. Furthermore, the uplink control channel resource mapping method (900) may further include a procedure (S930) of transmitting the mapped PUCCH to the transmission/reception point. Herein, the mapped PUCCH may be a PUCCH mapped to PUCCH resources at Step S920.

As described above, in the case of the X number of PRB pairs constituting one EPDCCH set, the X may be 2, 4, 8, (16), or (32) (i.e., X=2, 4, 8, (16), or (32)), and is not limited thereto. One EPDCCH set may or may not be constituted by a maximum of 16 PRB pairs according to type of the EPDCCH set. For example, a distributed EPDCCH set may be constituted by 16 PRB pairs. However, a localized EPDCCH set may be constituted by a maximum of 8 PRB pairs.

Figure 10:
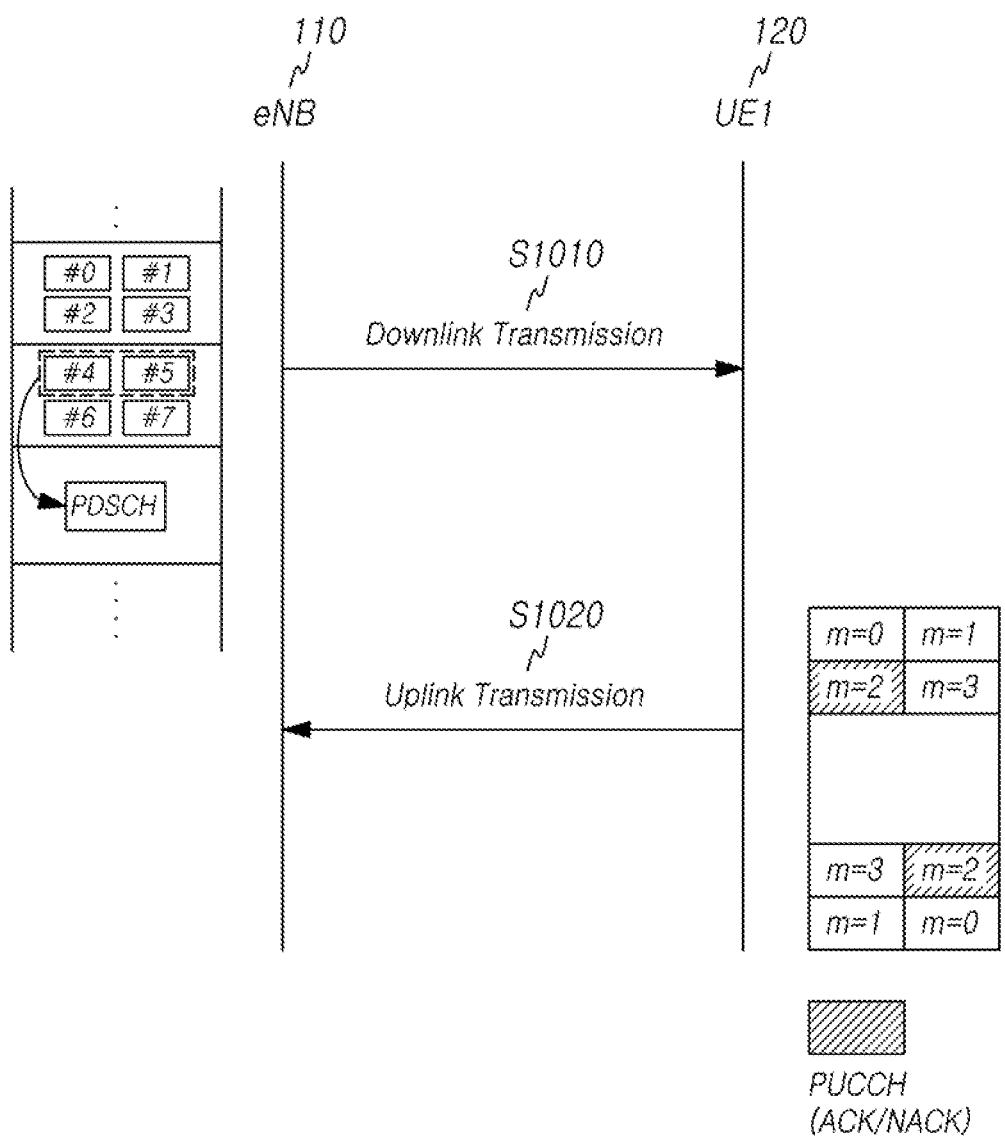
FIG. 10 is a flowchart illustrating a process including a downlink transmission of a transmission/reception point and an uplink transmission of user equipment.

FIG. 10 is a flowchart illustrating a process including a downlink transmission of a transmission/reception point and an uplink transmission of user equipment.

Referring to FIG. 10, at step S1010, a transmission/reception point (e.g., eNB 110) may transmit control information including downlink scheduling information to user equipment (e.g., UE 1 (120)), through EPDCCH of a data region of resource-block pairs (e.g., PRB pairs) in a subframe. Furthermore, at step S1010, the transmission/reception point (e.g., eNB 110) may transmit downlink data to the user equipment (e.g., UE 1 (120)) through PDSCH indicated (or assigned) by the downlink scheduling information.

As described with reference to FIG. 8, in order to transmit control information including downlink scheduling information through EPDCCH of a data region of PRB pairs in a specific subframe, eNB 110 may assign at least one localized EPDCCH set. Herein, each localized EPDCCH set may be constituted by an X number of physical resource-block (PRB) pairs (e.g., two PRB pairs) in the specific subframe. In this case, as described with reference to FIG. 7, in an EPDCCH set assignment procedure, an 'n' number of localized EPDCCH sets and an 'm' number of distributed EPDCCH sets may be assigned. Hereinafter, for simplification of description, the present embodiment will be described under the assumption that one localized EPDCCH set is assigned.

Meanwhile, eNB 110 may perform indexing of at least two ECCEs, per EPDCCH set. For example, in the case of at least one localized EPDCCH set constituted by two PRB pairs, corresponding ECCEs constituting each localized EPDCCH set may be separately indexed. As described in FIG. 7, in the case that an 'n' number of localized EPDCCH sets and an 'm' number of distributed EPDCCH sets are assigned, ECCEs may be separately indexed per EPDCCH set.

Meanwhile, at least one indexed ECCE may be assigned for control information. For example, as shown in FIG. 10, ECCE #4 and ECCE #5 may be assigned for the control information. The control information may be transmitted through the assigned ECCE(s) to a specific user equipment. In the case that the control information include downlink scheduling information, at step S1010, PDSCH indicated by the downlink scheduling information may also be transmitted to UE 1 (120) by a downlink transmission.

In the case of user equipment, at step S1010, UE 1 (120) may receive the control information including the downlink scheduling information, through EPDCCH from eNB 110. Furthermore, at step S1010, UE 1 (120) may receive downlink data through PDSCH indicated (or assigned) by the downlink scheduling information.

At step S1020, when performing an uplink transmission, UE 1 (120) may transmit a scheduling request (SR), Hybrid ARQ (HARQ) ACK for a received downlink data channel transmission blocks, and/or UE reports associated with a downlink channel state, through PUCCH. Furthermore, at step S1020, UE 1 (120) may transmit uplink data through PUSCH. In the case that user equipment is UE 1 (120), UE 1 (120) may perform an uplink transmission to eNB 110 corresponding to a first transmission/reception point, as shown in FIG. 2. Meanwhile, in the case that user equipment is UE 2 (122), UE 2 (122) may perform an uplink transmission to RRH 112 corresponding to a second transmission/reception point, as shown in FIG. 3.

Since a mapping in which control information depending on each PUCCH format is mapped to resource blocks (RBs) was already described with reference to FIG. 4, the detailed description thereof is omitted.

At step S1020, user equipment 120 may receive downlink scheduling information through EPDCCH assigned to data region of resource blocks. Furthermore, user equipment 120 may obtain corresponding PDSCH assignment information from the received downlink scheduling information. When receiving PDSCH, user equipment 120 may transmit HARQ ACK/NACK corresponding to a response to the PDSCH reception. In this case, for each antenna port, PUCCH resource mapping for feedback transmission of the HARQ ACK/NACK may be performed using PUCCH resource determination components. Herein, the PUCCH resource determination components may include at least one of an implicitly determined parameter $n_{implicit}$ (corresponding to $n_{CCE}$ in Formula 3 and Formula 4) determined based on ECCE, an explicitly determined parameter $N_{explicit}^{(k)}$ (corresponding to $N_{PUCCH}^{(1)}$ in Formula 3 and Formula 4), and an implicitly determined offset $offset_i$. Furthermore, in the case of receiving PDSCH, user equipment 120 may transmit HARQ ACK/NACK corresponding to a response to the PDSCH reception. In this case, as described above, for each antenna port, PUCCH resource mapping for feedback transmission of the HARQ ACK/NACK may be determined Formula 5 and Formula 6 above, respectively.

Control information including downlink scheduling information may be received through at least one of two ECCEs indexed separately per EPDCCH set. For example, as shown in FIG. 10, the control information may be received through ECCE #4 and ECCE #5. PDSCH reception may be performed according to indication of the downlink scheduling information included in the control information. PUCCH resource mapping for HARQ ACK/NACK feedback associated with the PDSCH reception may be performed using a lowest ECCE index (e.g., ECCE #4) as one PUCCH resource determination component. Furthermore, the PUCCH resource mapping may be separately performed for each antenna port. For example, if ECCE #4 is used as an implicitly determined parameter in Formula 5 and Formula 6, PUCCH may be mapped to PUCCH resources corresponding to m=2.

Figure 11:
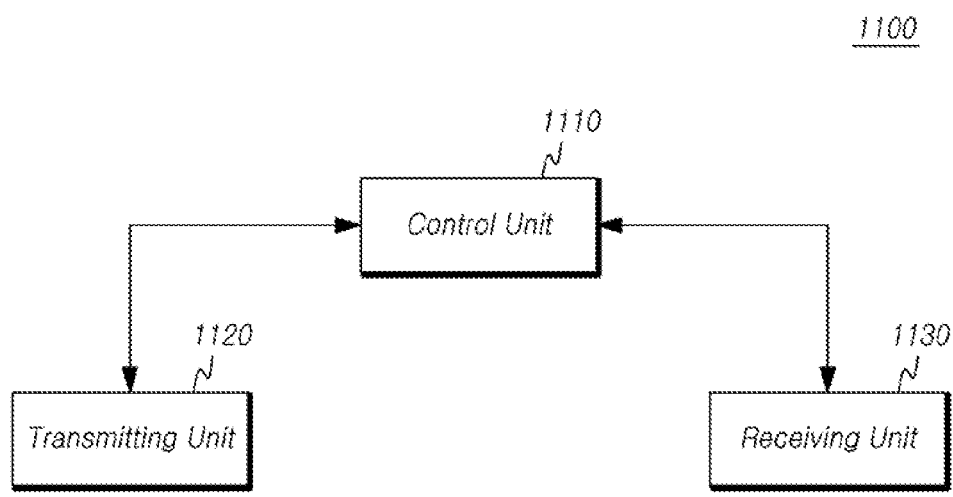
FIG. 11 is a diagram illustrating a transmission/reception point in accordance with some embodiments.

FIG. 11 is a diagram illustrating a transmission/reception point in accordance with some embodiments.

Referring to FIG. 11, transmission/reception point 1100 according to the present embodiment may include control unit 1110, transmitting unit 1120, and receiving unit 1130.

Control unit 1110 may control operations of the transmission/reception point (e.g., a base station), according to a method of transmitting control information for a specific user equipment through a data region of PRB pairs in a subframe.

In the case that the transmission/reception point transmits control information for a specific user equipment through a data region of PRB pairs in a subframe, control unit 1110 may assign at least one EPDCCH set. Herein, each EPDCCH set may be constituted by an X number of PRB pairs in the subframe. The X may be a natural number which is greater than or equal to "1" and is less than or equal to the number of PRBs per downlink bandwidth. Furthermore, control unit 1110 may perform an indexing procedure for at least two ECCEs, and may assign the control information to at least one of the indexed ECCEs. Herein, such ECCE indexing procedure may be performed per EPDCCH set.

As described above, in the case of the X number of PRB pairs constituting one EPDCCH set, the X may be 2, 4, 8, (16), or (32) (i.e., X=2, 4, 8, (16), or (32)), and is not limited thereto. One EPDCCH set may or may not be constituted by a maximum of 16 PRB pairs according to type of the EPDCCH set. For example, a distributed EPDCCH set may be constituted by 16 PRB pairs. However, a localized EPDCCH set may be constituted by a maximum of 8 PRB pairs.

Transmitting unit 1120 and receiving unit 1130 may transmit and receive, respectively, signals, messages, and/or data required for performing the above-described present embodiments, in connection with user equipment. For example, transmitting unit 1120 may transmit the above-described control information to a specific user equipment, through EPDCCH of a data region of PRB pairs in a specific subframe.

Figure 12:
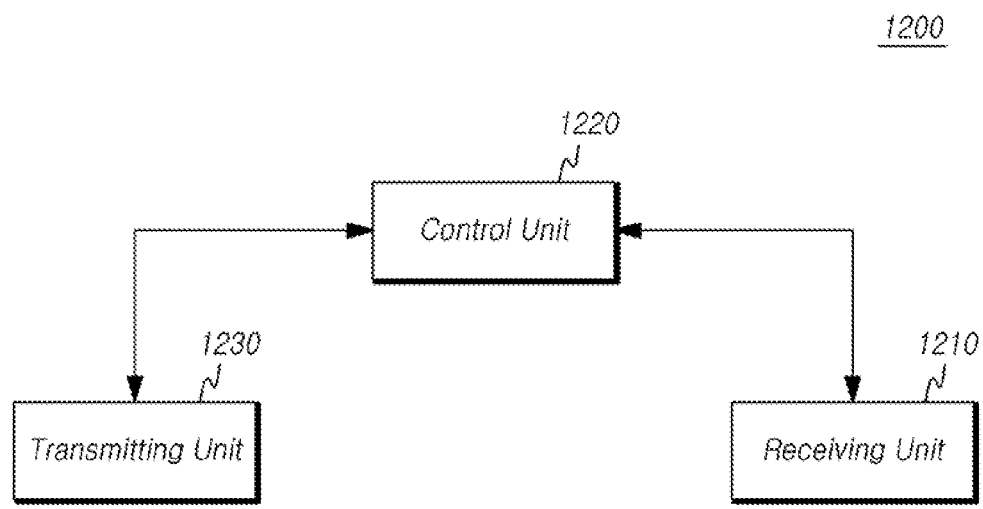
FIG. 12 is a diagram illustrating user equipment in accordance with some embodiments.

FIG. 12 is a diagram illustrating user equipment in accordance with some embodiments.

Referring to FIG. 12, user equipment 1200 according to the present embodiment may include receiving unit 1210, control unit 1220, and transmitting unit 1230.

Receiving unit 1210 may receive downlink control information, data, and/or messages through a corresponding channel from a transmission/reception point (e.g., a base station). Furthermore, receiving unit 1210 may receive control information including downlink scheduling information through at least one of at least two ECCEs from a transmission/reception point. Herein, the at least two ECCEs may be indexed separately per each of at least one EPDCCH set. The each EPDCCH set may include an X number of physical resource-block (PRB) pairs of a subframe, where the X is a natural number greater than "1".

Control unit 1220 may control operations of user equipment 1200, according to a PUCCH resource mapping method for uplink HARQ ACK/NACK feedback of user equipment 1200. Herein, user equipment 1200 may be configured to receive DCI through EPDCCH required for performing the present embodiment. Control unit 1220 may perform PUCCH resource mapping for ACK/NACK feedback associated with PDSCH, using a lowest ECCE index as one PUCCH resource determination component. Herein, the PDSCH may be assigned according to downlink scheduling information.

Transmitting unit 1230 may transmit control information, data, and/or messages through a corresponding channel to a transmission/reception point (e.g., a base station).

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the attached documents below may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting control information for a specific user equipment through a data region of physical resource-block (PRB) pairs in a subframe, in a transmission/reception point, the method comprising:
   assigning at least one enhanced physical downlink control channel (EPDCCH) set, wherein each EPDCCH set includes an X number of PRB pairs in the subframe, and the X is a natural number which is greater than or equal to "1" and is less than or equal to the number of resource blocks (RBs) per downlink bandwidth; and
   transmitting the control information to the specific user equipment through at least one of at least two enhanced control channel elements (ECCEs) indexed per EPDCCH set,
   wherein:
      each of the ECCEs includes at least one of four and eight resource-element groups; and
      the at least one of four and eight resource-element groups of each ECCE are located in one PRB pair or at least two PRB pairs, and
   wherein if the at least one of four and eight resource-element groups of each ECCE are located in one PRB pair,
      a product of a lowest index of PRB pairs transmitting the control information among the X number of PRB pairs of the each EPDCCH set and the number of ECCEs per PRB pair is used as one resource determination component, in the case of a physical uplink control channel (PUCCH) resource mapping of ACK/NACK associated with a physical downlink shared channel (PDSCH) assigned according to downlink scheduling information included in the control information.

2. The method of claim 1, wherein:
   if the at least one of four and eight resource-element groups of each ECCE are located in at least two PRB pairs,
   a lowest index of the at least one ECCE which transmits the control information and is indexed per EPDCCH set is used as one resource determination component in the case of the PUCCH resource mapping for the ACK/NACK associated with the PDSCH assigned according to the downlink scheduling information.

3. The method of claim 2, wherein:
   when the EPDCCH set is a localized EPDCCH set, resource-element groups of each ECCE are located in one PRB pair, and
   when the EPDCCH set is a distributed EPDCCH set, resource-element groups of each ECCE are located in two or more PRB pairs.

4. A method of mapping an uplink control channel resource in user equipment, the method comprising:
   receiving control information including downlink scheduling information through at least one of at least two enhanced control channel elements (ECCEs) from a transmission/reception point, wherein the at least two ECCEs are indexed per each of at least one enhanced physical downlink control channel (EPDCCH) set, the each EPDCCH set includes an X number of physical resource-block (PRB) pairs in a subframe, and the X is a natural number which is greater than or equal to "1" and is less than or equal to the number of resource blocks (RBs) per downlink bandwidth; and
   performing a physical uplink control channel (PUCCH) resource mapping for ACK/NACK associated with a physical downlink shared channel (PDSCH) assigned according to the downlink scheduling information,
   wherein:
      each of the ECCEs includes at least one of four and eight resource-element groups; and
      the at least one of four and eight resource-element groups of each ECCE are located in one PRB pair or at least two PRB pairs, and
   wherein if the at least one of four and eight resource-element groups of each ECCE are located in one PRB pair,
      a product of a lowest index of PRB pairs used for reception of the control information among the X number of PRB pairs of the each EPDCCH set and the number of ECCEs per PRB pair is used as one resource determination component in the case of performing the PUCCH resource mapping of the ACK/NACK.

5. The method of claim 4, wherein:
   if the at least one of four and eight resource-element groups of each ECCE are located in at least two PRB pair,
   a lowest index of the at least one ECCE used for reception of the control information is used as one resource determination component in the case of performing the PUCCH resource mapping for the ACK/NACK.

6. The method of claim 4, wherein:
   when the EPDCCH set is a localized EPDCCH set, resource-element groups of each ECCE are located in one PRB pair; and
   when the EPDCCH set is a distributed EPDCCH set, resource-element groups of each ECCE are located in two or more PRB pairs.

7. A transmission/reception point for transmitting control information for a specific user equipment through a data region of physical resource-block (PRB) pairs in a subframe, the transmission/reception point comprising:

a control unit configured to assign at least one enhanced physical downlink control channel (EPDCCH) set, wherein each EPDCCH set includes an X number of PRB pairs in the subframe, and the X is a natural number which is greater than or equal to "1" and is less than or equal to the number of resource blocks (RBs) per downlink bandwidth; and a transmitting unit configured to transmit the control information to the specific user equipment through at least one of at least two enhanced control channel elements (ECCEs) indexed per EPDCCH set, wherein:
  each of the ECCEs includes at least one of four and eight resource-element groups; and
  the at least one of four and eight resource-element groups of each ECCE are located in one PRB pair or at least two PRB pairs, and wherein if the at least one of four and eight resource-element groups of each ECCE are located in one PRB pair,
  a product of a lowest index of PRB pairs transmitting the control information among the X number of PRB pairs of the each EPDCCH set and the number of ECCEs per PRB pair is used as one resource determination component, in the case of a physical uplink control channel (PUCCH) resource mapping of ACK/NACK associated with a physical downlink shared channel (PDSCH) assigned according to downlink scheduling information included in the control information.

8. The transmission/reception point of claim 7, wherein:
if the at least one of four and eight resource-element groups of each ECCE are located in at least two PRB pair,
a lowest index of the at least one ECCE which is used for transmission of the control information and is indexed per EPDCCH set is used as one resource determination component in the case of the PUCCH resource mapping for the ACK/NACK associated with the PDSCH assigned according to the downlink scheduling information.

9. The transmission/reception point of claim 8, wherein:
when the EPDCCH set is a localized EPDCCH set, resource-element groups of each ECCE are located in one PRB pair; and
when the EPDCCH set is a distributed EPDCCH set, resource-element groups of each ECCE are located in two or more PRB pairs.

10. User equipment comprising:
a receiving unit configured to receive control information including downlink scheduling information through at least one of at least two enhanced control channel elements (ECCEs) from a transmission/reception point, wherein the at least two ECCEs are indexed per each of at least one enhanced physical downlink control channel (EPDCCH) set, the each EPDCCH set includes an X number of physical resource-block (PRB) pairs in a subframe, and the X is a natural number which is greater than or equal to "1" and is less than or equal to the number of resource blocks (RBs) per downlink bandwidth; and a control unit configured to perform a physical uplink control channel (PUCCH) resource mapping for an ACK/NACK associated with a physical downlink shared channel (PDSCH) assigned according to the downlink scheduling information, wherein:
  each of the ECCEs includes at least one of four and eight resource-element groups; and
  the at least one of four and eight resource-element groups of each ECCE are located in one PRB pair or at least two PRB pairs, and wherein if the at least one of four and eight resource-element groups of each ECCE are located in one PRB pair,
  a product of a lowest index of PRB pairs used for reception of the control information among the X number of PRB pairs of the each EPDCCH set and the number of ECCEs per PRB pair is used as one resource determination component in the case of performing the PUCCH resource mapping of the ACK/NACK.

11. The user equipment of claim 10, wherein:
if the at least one of four and eight resource-element groups of each ECCE are located in at least two PRB pair,
a lowest index of the at least one ECCE used for reception of the control information is used as one resource determination component in the case of performing the PUCCH resource mapping for the ACK/NACK.

12. The user equipment of claim 10, wherein:
when the EPDCCH set is a localized EPDCCH set, where resource-element groups of each ECCE are located in one PRB pair; and
when the EPDCCH set is a distributed EPDCCH set, resource-element groups of each ECCE are located in two or more PRB pairs.

* * * * *